E. A. FORSBERG.
BALL OR ROLLER BEARING.
APPLICATION FILED DEC. 23, 1918.
1,334,027.
Patented Mar. 16, 1920.
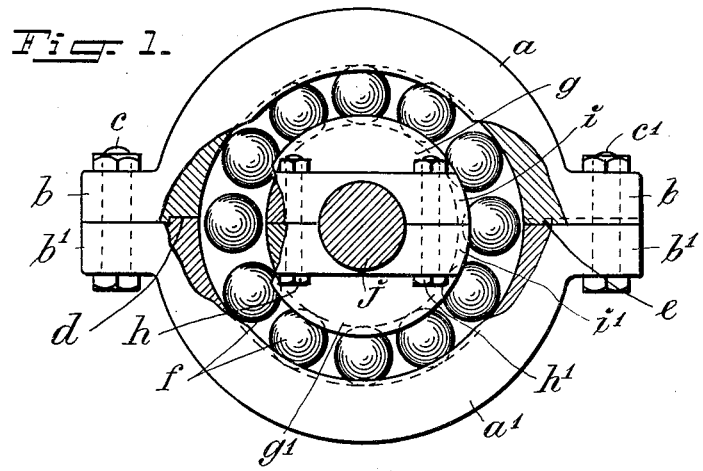
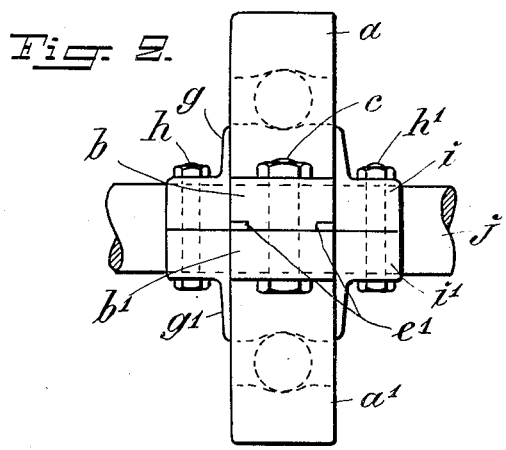
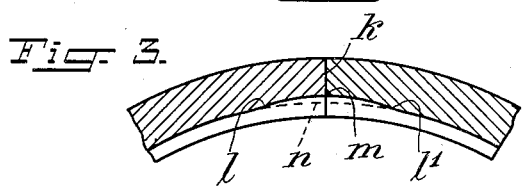
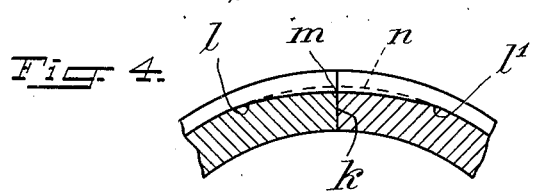
Inventor.
E. A. Forsberg.
By H. R. Kerslake
Atty

UNITED STATES PATENT OFFICE.

ERIK AUGUST FORSBERG, OF STOCKHOLM, SWEDEN.

BALL OR ROLLER BEARING.

1,334,027.  Specification of Letters Patent.  Patented Mar. 16, 1920.

Application filed December 23, 1918. Serial No. 268,027.

*To all whom it may concern:*

Be it known that I, ERIK AUGUST FORSBERG, subject of the King of Sweden, residing at Stockholm, Sweden, have invented certain new and useful Improvements in Ball or Roller Bearings, of which the following is a specification.

This invention relates to roller or ball bearings of the type in which the rollers or the balls pass one or more joints or other edges in the track. Bearings of this kind, for instance, so constructed that one or both of the rings between which the balls or the rollers are moving, are so divided, that the joints are located in the tracks, or so, that recesses, apertures or indents, extending to the track and serving as filling passages for the balls or rollers are provided, closing members being inserted, if desired, into said recesses or apertures.

Such bearings are connected with the inconvenience that the balls or rollers, when passing the joints or the edges, stress the material too hardly thus causing yielding of the material and possibly also permanent deformations. On account thereof the material is successively damaged, and the balls or rollers will shortly be subject to shocks destroying the same, and finally the bearing will be unserviceable.

In the case of divided ball bearings it has been proposed to evade said inconveniences by recessing the track at the joint, where the balls are passing, to some extent within the normal outline of the track, thereby causing the balls, when passing the joint, to be unloaded. Such recesses have, however, hitherto been unsuitably formed, and on account thereof the object desired has not been attained. This invention has for its object to so form the recess that, in fact, an effective and suitable unloading of the balls or rollers is obtained.

Said recess must not be less than the sum of the yielding radial deformation of the ball or roller and that of the track, when subject to a maximum load, and should not extend in peripheral direction farther than the distance between the contact points of two adjacent balls or rollers, since otherwise, on the one hand, the unloading could be incomplete while, on the other hand, more than one ball or roller could be unloaded at the same time. Obviously, the greater the radial recess within the normal track is and the less the peripheral extension is, the more difficult is the formation of the recess in such manner that the passage of the ball or roller past said recess takes place without stressing the material too much.

Since, as mentioned above, the recess is fixed as to its minimum amount and the peripheral extension as to its maximum amount, it stands to reason, that certain difficulties will arise in determining the suitable shape of the recess.

This invention relates to a recess so formed that, on the one hand, any increase of the stresses of the material at the passage from the normal track to the recess is prevented as far as possible, and, on the other hand, that the unloading of the balls or rollers and the tracks at the movement toward the joint or the edge and the loading at the movement therefrom takes place as evenly as possible, for the purpose of decreasing the fatigue phenomena otherwise arising.

This is obtained, according to the invention, by the fact that the normal track and the curvature of the recess have a common tangent at the transition point. Besides, the radius of curvature is the same or approximately the same for both at the transition points between the normal track and the curve of the recess.

In the case of a roller or ball bearing having the outer or the inner ring or both divided and the outer ring located radially outside the inner ring, the curve of the recess is preferably so formed at the joint that it forms right angles with the radius.

Moreover, the curve of the recess is so formed as to have at the joint a radius of curvature which in outer tracks is lesser and in inner tracks greater than the radius of the normal track, but always having the same direction as the latter radius.

In the inner ring the curve of the recess is so formed as to lie, in its totality, beyond a chord connecting the two points in which the curve of the recess and the normal track coincide.

When applying the invention to ball or roller bearings having recesses, channels or apertures serving as filling passages for the balls or rollers, such separate members may, under certain circumstances, be omitted by means of which said recesses etc. are closed after the balls or rollers are filled in. Obviously, in such case only the first and the last part of the curve of the recess are used, the intermediate part being omitted. The two parts used are formed as mentioned above.

It will be easily understood that the curvature of the recess is very slight. It is even to be preferred that the recess be so small that the balls or rollers, when passing the joint or the edge, though just unloaded, do not lose the contact with the ring or rings but continue to roll also at the recess. Thereby the inconvenience is evaded which otherwise could arise, owing to the balls or rollers losing their speed at the recess, viz. that the balls or rollers, when touching against the track, would slide thereon which would cause tear and wear of the track and of the balls or rollers.

Besides, it is to be preferred so to locate the joints or edges that they lie in directions in which the load on the balls or the rollers is comparatively small. In a common radial ball bearing having only to sustain a downward pressure the edge, if consisting of a single edge or of two adjacent edges, is placed in upward direction. If two edges or joints are at hand lying about diametrically, they are placed in or near to a horizontal plane.

An embodiment of the invention applied to a ball bearing having the inner and the outer ring divided into two parts is illustrated in the accompanying drawing in which—

Figure 1 is a side-view of the bearing partially in section. Fig. 2 is an edge-view. Figs. 3 and 4 show on a greater scale parts of an outer and an inner ring, the curve of the recess being exaggerated for the sake of clearness.

Referring to the drawing, $a$ and $a^1$ are the halves of the outer ring, $b$ and $b^1$ are flanges serving to connect the same, and $c$, $c^1$ are bolts, passing through said flanges. In order to fix the said halves in their positions in relation to each other, they may be provided with recesses, as shown at $d$ to the left and at $e$ to the right. The recess $d$ prevents radial movement and the recess $e$ axial movement. Of course, said both kinds of recesses may be used simultaneously and may be double, as shown at $e'$ in Fig. 2.

At the joints the outer as well as the inner track is recessed to a certain extent to effect the unloading of the balls and the rings. $f$ denotes the balls, $g$, $g^1$ the inner ring halves which are connected by means of the bolts $h$ and $h^1$ passing through the projections $i$ and $i^1$ respectively. $j$ is the shaft.

Fig. 3 shows a portion of an outer track. $k$ designates the joint. The recess commences and ends at $l$, $l^1$ and the depth thereof is such that the outline of the bottom of the track passes through $m$, $n$ is the normal track as shaped, before the recess was made. The recess is symmetrical in relation to the joint $k$, the unloading and the reloading thus taking place equally. The first condition for the ball being capable of passing the points $l$ and $l^1$ without dangerous increasing of the stress is that no sharp edge be formed at the point of coincidence $l$, $l^1$ of the normal track and the recess, that is to say, that both curves in this place have a common tangent. Furthermore, the radius of curvature should not change too suddenly, which would cause a very sudden change of the stress of the material and fatigue of the same. Preferably, the recess is so formed that its radius of curvature in the points $l$ and $l^1$ is the same or nearly the same as that of the normal track. Since, besides, no bending may take place in the point $m$ and because of the curve halves being symmetrical, the tangent of the curve in said point forms right angles with the radius. In order that the unloading may take place as evenly as possible, the changes of direction of the recess should be small, and therefore the radius of curvature in the point $m$ is, preferably, less than the radius of the normal track, but yet having the same direction as the latter.

Fig. 4 shows a portion of an inner track. The same references occur in this figure.

Also in this case the curve of the recess is symmetrical in relation to the joint $k$. Obviously, the same conditions as to the common tangent and the nearly equal radius of curvature in $l$ and $l^1$ are valid in this case. In the point $m$ the radius of curvature is greater than the radius of the normal track and has the same direction as the latter, since otherwise a sharper convex curvature would be at hand between the points $l$ and $m$, which would increase the stress of the balls and the tracks. Besides, the curve of the recess is so shaped that in its entirety it is positioned outside the chord connecting the points $l$ and $l^1$.

If the invention is applied to ball or roller bearings having channels or apertures serving as fill-passages for the balls or rollers ending at or nearly at the bottom of the tracks and closed by means of separate members, the curve should be formed correspondingly. The curve of the recess may, however, in this case be positioned somewhat at the side of the central plane of the normal track, because the channels or apertures need not necessarily be directed radially.

If the closing members are omitted, the curve of the recess may be formed correspondingly, though in this case the question may sometimes be about its both end portions only.

Finally, it is to be noted that both the tracks need not necessarily be divided. One of them, preferably the outer one, may be undivided, and in certain cases, as for instance when used in connection with crank axles, said outer track may be mounted undivided, whereas the inner track must be divided. The tracks may, besides, be of any suitable shape, as for instance groove-shaped, cylindrical or spherical and the bearing may have one, two or more sets of balls. The division may be made on a radial or oblique plane or on a suitably formed curved surface.

If the whole bearing is to be dismounted in two parts the ball-cage also, if used, is to be divided.

Claims:

1. A ball or roller bearing including a sectional inner ring, a sectional outer track, one of said parts being provided at the joints with a recess within the normal curve of the part and the normal curve and the curve of the recess having a common tangent at the point of transition.

2. An arrangement as set forth in claim 1 characterized by the curve of the recess having approximately the same radius of curvature, at the point of transition to the normal track, as said track.

3. An arrangement as set forth in claim 1 characterized by the curve of the recess forming at the very joint, right angles with the radius and having a radius of curvature which in outer tracks is lesser and in inner tracks is greater than the radius of the normal track, but always has the same direction as the latter.

4. An arrangement as set forth in claim 1, and applied to inner tracks, characterized by the curve of the recess being positioned, in its entirety, outside the line connecting the points in which said curve and the normal track coincide.

5. An arrangement as set forth in claim 1 wherein the recess is of such size that the balls are approximately unloaded when passing the joints of the rings but however lightly engage both the track and the rings.

In testimony whereof I affix my signature in presence of two witnesses.

ERIK AUGUST FORSBERG.

Witnesses:
  JACOB BAGGE,
  CHARLES H. LAFELY.